United States Patent [19]

Masuda et al.

[11] Patent Number: 5,558,704
[45] Date of Patent: Sep. 24, 1996

[54] PAVING ASPHALT CONCRETE COMPOSITION

[75] Inventors: Kinji Masuda; Minoru Kuriki, both of Yokohama; Kozo Hokari, Niigata, all of Japan

[73] Assignees: Bridgestone Corporation, Tokyo; Fukuda Road Construction Co., Ltd., Niigata Pref. both of Japan

[21] Appl. No.: 502,157

[22] Filed: Jul. 13, 1995

[51] Int. Cl.$^6$ .......................................................... C08L 9/00
[52] U.S. Cl. ........................ 106/281.1; 106/278; 524/62; 524/70; 524/71
[58] Field of Search ................................. 106/281.1, 278; 524/68, 70, 71, 62

[56] References Cited

U.S. PATENT DOCUMENTS

| | | | |
|---|---|---|---|
| 4,025,711 | 5/1977 | Davidson et al. | 528/488 |
| 4,025,990 | 5/1977 | Lovette, Jr. | 241/14 |
| 4,146,508 | 3/1979 | Maxwell | 260/2.3 |
| 4,166,049 | 8/1979 | Huff | 260/2.3 |
| 4,840,316 | 6/1989 | Barclay | 241/79 |
| 5,304,576 | 4/1994 | Martinez | 521/41 |
| 5,334,641 | 8/1994 | Rouse | 524/71 |
| 5,391,226 | 2/1995 | Frankowski | 106/696 |
| 5,436,285 | 7/1995 | Causyn et al. | 524/68 |

FOREIGN PATENT DOCUMENTS

| | | | |
|---|---|---|---|
| 2462459 | 3/1981 | France | 106/281.1 |
| 2062268 | 6/1971 | Germany | 106/281.1 |

OTHER PUBLICATIONS

HSO, vol. 30, No. 3, 1995, pp. 22–30 with English Language Abstract (no month).

*Primary Examiner*—Anthony Green
*Attorney, Agent, or Firm*—Sughrue, Mion, Zinn, Macpeak & Seas

[57] ABSTRACT

A paving asphalt concrete composition consists essentially of an oil-impregnated vulcanized rubber crumb and an asphalt-aggregate mixture, in which the oil-impregnated vulcanized rubber crumb consist of 99–60% by weight of vulcanized rubber crumb and 1–40% by weight of an extending oil. This paving asphalt concrete composition is suitable for pavement of motorways, sidewalks, runways, taxiways, parking lots and the like.

33 Claims, No Drawings

PAVING ASPHALT CONCRETE COMPOSITION

BACKGROUND OF THE INVENTION

1. Field of the Invention

This invention relates to a paving asphalt concrete composition, and more particularly to an asphalt concrete composition suitable for pavement of motorways, sidewalks, runways, taxiways, parking lots and the like using a modified asphalt-based paving binder composed of a hot asphalt mixture or a stabilized hot asphalt mixture used in a surface course, binder course or a base of a road.

1. Description of the Related Art

From old times, vulcanized rubber crumb (e.g. made from waste tires and the like) have been applied to paving materials as an aggregate or a binder.

As the application as a paving aggregate, there are so-called elastic pavements such as promenades and jogging courses for providing walking comfort by utilizing the elasticity of rubber, anti-freezing pavements such as motorways in snowy and cold areas for breaking a frozen ice layer by utilizing the elasticity of rubber to prevent passing vehicles from slipping, and so on.

As the application as a paving binder, there are a modified paving binder having excellent adhesion and tackiness, which is obtained by mixing vulcanized rubber crumb and aromatic oil with molten asphalt and heating at a temperature above 200° C. with stirring, and so on. The modified binder using the vulcanized rubber crumb (hereinafter referred to as a vulcanized rubber binder) was developed in the United States of America during the 1960s from a viewpoint of recycling waste tires and later introduced even in Europe. At the present time, the vulcanized rubber binder is widely used around Europe and America as a modified binder for porous pavement, an adhesive for a stress absorbing layer sandwiched between the existing pavement and new pavement, or the like.

In case of the paving aggregate, there is a problem that the compaction by rollers is insufficient because the vulcanized rubber crumb dispersed in the vulcanized asphalt mixture acts as a cushion and hence the durability of the pavement is poor. The vulcanized rubber crumb used as an aggregate is mixed in an amount of 3% by weight at maximum with 97% by weight of the vulcanized asphalt mixture. The resulting mixture could only offer the lowest quality to be used for general-purpose motorways, which considerably degrades the pavement durability as compared with the ordinary pavement.

When the vulcanized rubber binder is used as a binder for the hot asphalt mixture, there is derived a greatest problem due to the influence of heat upon the vulcanized rubber in the binder production. That is, when the vulcanized rubber crumb, asphalt and oil are heated with stirring, the vulcanized rubber is swelled and gelated to render into a modified binder having a high viscosity, but as overheating or reheating is repeated, it is softened and becomes extremely unstable to develop no function as a paving binder. In other words, the vulcanized rubber binder is difficult to store under a higher temperature. Therefore, the vulcanized rubber binder should be produced by using a special binder production apparatus in the vicinity of a production plant for the hot asphalt mixture in real time, so that there are many restriction conditions in the production of the hot asphalt mixture.

On the other hand, asphalt containing a usual modified binder is transported from asphalt producing or storing facilities to the production plant for the hot asphalt mixture at a high temperature state and temporarily stored in an asphalt tank of the plant. Thereafter, the stored asphalt can be taken from the tank in an adequate amount at need, so that the degree of freedom in the production of the hot asphalt mixture is very large as compared with the use of the above vulcanized rubber binder.

In case of the production of the hot asphalt mixture containing the vulcanized rubber binder as mentioned above, it is necessary to use a large-size movable mixer capable of producing an adequate amount of the vulcanized rubber binder corresponding to the amount of the mixture to be produced, which requires the increase of installation and labor and hence brings about considerable increase of cost. In such a conventional system producing the vulcanized rubber binder, hot stored asphalt, vulcanized rubber crumb and oil are simultaneously charged into the special large-size mixer with stirring to produce the vulcanized rubber binder, which is transported into the asphalt plant in real time to produce the hot asphalt mixture. Since the vulcanized rubber binder is difficult to be stored under heating, it is considered that such a conventional system is unsuitable for the method of small-lot production destined for a great number of delivery sites commonly adopted in Japan.

SUMMARY OF THE INVENTION

It is, therefore, an object of the invention to provide a paving asphalt concrete composition using the vulcanized rubber crumb which can omit the use of the special mixer for the production of the binder and complicated steps as mentioned above or can induce performances inherent to vulcanized rubber asphalt after the production of a hot asphalt mixture by previously mixing the vulcanized rubber crumb with an extending oil to swell the vulcanized rubber crumb and directly charging into a mixer for the production of the hot asphalt mixture to promote gelation of the vulcanized rubber crumb through utilization of heat generated in the production of the hot asphalt mixture.

According to the invention, there is the provision of a paving asphalt concrete composition consisting essentially of 0.3–20% by weight of an oil-impregnated vulcanized rubber crumb and 99.7–80% by weight of an asphalt-aggregate mixture, the oil-impregnated vulcanized rubber crumb consisting of 99–60% by weight of vulcanized rubber crumb and 1–40% by weight of an extending oil.

DESCRIPTION OF THE PREFERRED EMBODIMENTS

The asphalt used in the production of asphalt concrete composition according to the invention is selected from the group consisting of straight asphalts 40/60, 60/80 and 80/100, semi-blown asphalt AC-100, modified asphalts I-type and II-type, high-viscosity binder for porous pavement and the like. Among them, straight asphalt 60–80 is standard.

The aggregate is not particularly restricted, but includes crushed stones, sand, stone powder and the like usually used in the paving asphalt concrete. Furthermore, the grading distribution and compounding ratio of the aggregate are not restricted, but the grading distribution and compounding ratio used in the dense-graded, fine-graded, or open-graded asphalt concrete can be adopted in accordance with use purpose.

An asphalt-aggregate mixture can be obtained by mixing 96–80% by weight of the aggregate with 4–20% by weight of asphalt according to a usual manner.

The vulcanized rubber crumb are mainly made from waste tires, desirably waste tires for large-size vehicles such as truck and bus. The rubber grain size of the crushed waste tire is within a range of 0.01–100 mm, preferably 0.05–10 mm.

As the extending oil, use may be made of paraffinic oils, naphthenic oils, aromatic oils and the like. Among them, it is desirable to use the paraffinic oil, naphthenic oil or a blend thereof capable of mixing with the vulcanized rubber crumb at room temperature.

When the compounding amount of the extending oil to the vulcanized rubber crumb is less than 1% by weight, the swelling of the vulcanized rubber crumb can not be expected, while when it exceeds 40% by weight, the extending oil becomes excessive and the function of the vulcanized rubber crumb can not be developed. Therefore, the compounding amount of the extending oil is 1–40% by weight to 99–60% by weight of the vulcanized rubber crumb. Preferably, the compounding amount of the extending oil is 5–30% by weight to 95–70% by weight.

Further, when the amount of the oil-impregnated vulcanized rubber crumb (a mixture of vulcanized rubber crumb and extending oil) to the asphalt-aggregate mixture is less than 0.3% by weight, the effectively improving effect can not be obtained, while when it exceeds 20% by weight, the viscosity excessively increases and hence a load is undesirably applied to the mixer and it is difficult to conduct spreading and rolling operations in the execution. Therefore, the compounding amount of the oil-impregnated vulcanized rubber crumb is within a range of 0.3–20% by weight to 99.7–80% by weight of the asphalt-aggregate mixture. Preferably, the amount of the oil-impregnated vulcanized rubber crumb is 1–10% by weight in case of using as an aggregate and 0.5–3.0% by weight in case of using as a binder.

In the production of the asphalt concrete composition according to the invention, the oil-impregnated vulcanized rubber crumb are mixed with the asphalt-aggregate mixture at a temperature of 140°–220° C., preferably 160°–200° C. When the temperature in the mixing is lower than 140° C. the oil-impregnated vulcanized rubber crumb are not sufficiently gelated, while when it exceeds 220° C., the heat deterioration of asphalt and the softening of the oil-impregnated vulcanized rubber crumb are promoted.

Moreover, the asphalt concrete composition according to the invention may be compounded with various additives such as aromatic mineral oil, naphthenic mineral oil, fibrous reinforcing material, stabilizer, anti-stripping agent and the like for improving the spreadability of the aggregate and the like.

The paving asphalt concrete compositions according to the invention have excellent anti-fluidity, abrasion resistance and low-temperature brittleness. Particularly, the thickness of the binder to the aggregate can be made considerably thick to enhance the adhesion to the aggregate, whereby the composition having excellent peeling resistance, aging resistance and durability can be provided. Therefore, the paving asphalt concrete composition according to the invention is particularly effective to porous pavement having a large porosity in addition to the conventional hot asphalt mixture represented by the dense-graded asphalt concrete.

The following examples are given in illustration of the invention and are not intended as limitations thereof.

As materials used in Examples and Comparative Examples, physical properties of the vulcanized rubber crumb are shown in Table 1, and physical properties of straight asphalt 60/80 and vulcanized rubber binder are shown in Table 2. Moreover, the aggregates used are of standard quality.

TABLE 1

| Vulcanized rubber crumb used as an aggregate (Example 1) | | Vulcanized rubber crumb used as a binder (Examples 2 and 3) | |
| --- | --- | --- | --- |
| Grain size | Content (%) | Grain size | Content (%) |
| >2.0 mm | 0.5 | >0.71 mm | 2.2 |
| 2.0–1.68 mm | 8.6 | 0.71–0.59 mm | 14.8 |
| 1.68–1.19 mm | 30.1 | 0.59–0.42 mm | 32.1 |
| 1.19–0.71 mm | 52.8 | 0.42–0.297 mm | 33.9 |
| <0.71 mm | 8.0 | <0.297 mm | 17.0 |
| Specific gravity | 1.10–1.18 | Specific gravity | 1.10–1.2 |

TABLE 2

| Items | Straight asphalt 60/80 | Vulcanized rubber binder (Comparative Example 5) |
| --- | --- | --- |
| Penetration [1/10 mm] | 67 | 75 |
| Softening point [°C.] | 48.0 | 54.5 |
| Elongation (15° C.) | +100 | +100 |
| (cm) (7° C.) | — | 17 |
| Toughness (25° C.) [kgf · cm] | 40 | 67 |
| Tenacity (25° C.) [kgf · cm] | 10 | 40 |
| Viscosity at 60° C. [poise] | 2000 | 7270 |
| Density [g/cm$^3$] | 1.031 | 1.045 |

EXAMPLE 1

An oil-impregnated vulcanized rubber crumb (100% by weight) is obtained by mixing 85% by weight of the vulcanized rubber crumb having properties shown in Table 1 with 15% by weight of an extending naphthenic oil. Then, 3.0% by weight of the oil-impregnated vulcanized rubber crumb is added to an asphalt-aggregate mixture obtained by mixing 7% by weight of the straight asphalt 60/80 having properties shown in Table 2 with 93% by weight of aggregates having a compounding ratio shown in Table 3 under heating, whereby there is obtained a dense-graded asphalt concrete composition. The measured results on physical properties of this composition are shown in Table 4.

Moreover, this example shows the use of the oil-impregnated vulcanized rubber crumb as an aggregate.

Comparative Example 1

A dense-graded asphalt concrete composition containing the vulcanized rubber crumb is obtained by the same procedure as in Example 1 except that the extending oil is not added to the vulcanized rubber crumb. The physical properties of the composition are shown in Table 4.

Comparative Example 2

A usual dense-graded asphalt concrete composition is obtained by mixing 5.8% by weight of the straight asphalt 60/80 having properties shown in Table 2 with 95.2% by weight of the aggregates having the compounding ration shown in Table 3 without using the oil-impregnated vulcanized rubber crumb. The physical properties of the composition are shown in Table 4.

TABLE 3

Compounding ratio of aggregates
(dense-graded asphalt concrete (13))

| | No. 6 Crushed stones | No. 7 Crushed stones | Coarse sand | Fine sand | Stone powder | others |
|---|---|---|---|---|---|---|
| Example 1 | 36 | 25 | 25 | 8 | 6 | 3 (oil-impregnated vulcanized rubber crumb) |
| Comparative Example 1 | 36 | 22 | 25 | 8 | 6 | 3 (vulcanized rubber crumb) |
| Comparative Example 2 | 36 | 22 | 25 | 8 | 6 | — |

TABLE 4

Properties of dense-graded asphalt
concrete (13) after impact compaction 50 times

| Items | Example 1 | Comparative Example 1 | Comparative Example 2 |
|---|---|---|---|
| Optimum asphalt amount (%)* | 7.0 | 7.2 | 5.8 |
| Porosity (%)** | 3.8 | 3.8 | 3.8 |
| Marshall stability (kg)** | 720 | 680 | 930 |
| Residual stability (%)** | 95.3 | 73.2 | 85.6 |
| Dynamic stability (times/mm)** | 850 | 710 | 650 |
| Spike abrasion (cm$^3$)** | 12.1 | 18.6 | 12.5 |
| Brittle point in simple bending test (°C.)** | +6 | +9 | +10 |

(Note)
Testing method:
*Guideline for Asphalt Pavement (Japan Road Association)
**Pavement Testing Handbook (Japan Road Association)

As seen from Table 4, the dense-graded asphalt concrete composition containing the oil-impregnated rubber crumb according to the invention (Example 1) largely improves the dynamic stability, spike abrasion, brittle point in bending test and the like as compared with the dense-graded asphalt concrete composition containing the vulcanized rubber crumb not impregnated with oil (Comparative Example 1) and the usual dense-graded asphalt concrete composition (Comparative Example 2).

EXAMPLE 2

An oil-impregnated vulcanized rubber crumb (100% by weight) are obtained by mixing 80% by weight of the vulcanized rubber crumb having properties shown in Table 1 with 20% by weight of an extending naphthenic oil. Then, 1.2% by weight of the oil-impregnated vulcanized rubber crumb (as an extra addition) is added to an asphalt-aggregate mixture obtained by mixing 6.9% by weight of the straight asphalt 60/80 having properties shown in Table 2 with 93.1% by weight of aggregates having a compounding ratio shown in Table 5 under heating, whereby there is obtained a dense-graded asphalt concrete composition. The measured results on physical properties of this composition are shown in Table 6.

Moreover, this example shows the use of the oil-impregnated vulcanized rubber crumb as a binder.

TABLE 5

Compounding ratio of aggregates
dense-graded asphalt concrete (13) (%)

| | No. 6 crushed stones | No. 7 crushed stones | Coarse sand | Fine sand | Stone powder | oil-impregnated vulcanized rubber crumb |
|---|---|---|---|---|---|---|
| Example 2 | 36 | 22 | 28 | 8 | 6 | 1.2 (extra addition) |

TABLE 6

Properties of dense-graded asphalt
concrete (13) after impact compaction 50 times

| Items | Example 2 | Comparative Example 2 |
|---|---|---|
| Optimum asphalt amount (%)* | 6.9 | 5.8 |
| Porosity (%)** | 3.8 | 3.8 |

TABLE 6-continued

Properties of dense-graded asphalt concrete (13) after impact compaction 50 times

| Items | Example 2 | Comparative Example 2 |
|---|---|---|
| Marshall stability (kg)** | 700 | 930 |
| Residual stability (%)** | 98.6 | 85.6 |
| Dynamic stability (times/mm)** | 1810 | 650 |
| Spike abrasion (cm$^3$)** | 11.3 | 12.5 |
| Brittle point in simple bending test (°C.)** | +2 | +10 |

As seen from Table 6, the dense-graded asphalt concrete composition containing the oil-impregnated vulcanized rubber crumb according to the invention (Example 2) largely improves the dynamic stability, spike abrasion, brittle point in bending test and the like as compared with the usual dense-graded asphalt concrete composition (Comparative Example 2).

EXAMPLE 3

An oil-impregnated vulcanized rubber crumb (100% by weight) are obtained by mixing 80% by weight of the vulcanized rubber crumb having properties shown in Table 1 with 20% by weight of an extending naphthenic oil. Then, 1.2% by weight of the oil-impregnated vulcanized rubber crumb (as an extra addition) is added to an asphalt-aggregate mixture obtained by mixing 6% by weight of the straight asphalt 60/80 having properties shown in Table 2 with 94% by weight of aggregates having a compounding ratio shown in Table 7 under heating, whereby there is obtained a porous asphalt concrete composition. The measured results on physical properties of this composition are shown in Table 8.

Moreover, this example shows the use of the oil-impregnated vulcanized rubber crumb as a binder.

Comparative Example 3

A usual porous asphalt concrete composition (100% by weight) is obtained by mixing 6.4% by weight of the straight asphalt 60/80 having the properties shown in Table 2 with 93.6% by weight of aggregates having a compounding ratio shown in Table 7 without using the oil-impregnated vulcanized rubber crumb. The properties of the composition are shown in Table 8.

Moreover, the composition of this example is according to the specification of the Federal Highway Agency of the United States (FHWA).

Comparative Example 4

A porous asphalt concrete composition is obtained by mixing 5.5% by weight of the straight asphalt 60/80 having the properties shown in Table 2 with 94.5% by weight of aggregates having a compounding ratio shown in Table 7 and 0.5% by weight of vegetable fiber (extra addition) without using the oil-impregnated vulcanized rubber crumb. The properties of the composition are shown in Table 8.

Moreover, the composition of this example is according to German specification.

Comparative Example 5

A porous asphalt concrete composition (100% by weight) is obtained by mixing 6.1% by weight of the straight asphalt 60/80 having the properties shown in Table 2, which is obtained by charging vulcanized rubber crumb and aromatic oil into molten straight asphalt 60/80 and stirring in a mixer for the production of the binder at a temperature above 200° C. under heating, with 93.9% by weight of aggregates having a compounding ratio shown in Table 7 without using the oil-impregnated vulcanized rubber crumb. The properties of the composition are shown in Table 8.

Moreover, the composition of this example is according to French specification.

TABLE 7

| | Compounding ratio of aggregates (Porous asphalt concrete (13)) | | | |
|---|---|---|---|---|
| | No. 6 crushed stones | Coarse sand | Stone powder | |
| Example 3 | 85 | 11 | 4 | 1.2% extra addition of oil-impregnated vulcanized rubber crumb |
| Comparative Example 3 | 85 | 11 | 4 | — |
| Comparative Example 4 | 85 | 11 | 4 | 0.5% extra addition of vegetable fiber |
| Comparative Example 5 | 85 | 11 | 4 | — |

TABLE 8

Properties of porous asphalt concrete (13) after impact compaction 50 times

| | Example 3 | Comparative Example 3 | Comparative Example 4 | Comparative Example 5 |
|---|---|---|---|---|
| Optimum asphalt amount (%)* | 6.0 | 6.4 | 5.5 | 6.1 |
| Porosity (%)** | 20.1 | 19.8 | 20.9 | 20.5 |
| Coefficient of permeability (× 10$^{-2}$ cm/sec)** | 22.5 | 23.6 | 18.6 | 25.3 |
| Splitting strength (kg/cm$^2$)** | 25.5 | 22.7 | 16.9 | 24.9 |
| Residual splitting strength (%)** | 90.3 | 81.2 | 70.9 | 91.6 |
| Cantabro loss (%) | 7.3 | 20.7 | 37.9 | 6.5 |
| Residual Cantabro loss (%) | 8.6 | 51.1 | 48.2 | 8.2 |
| Dynamic stability (times/mm)** | 560 | destroyed | destroyed | 480 |

Note) Test Method

Cantabro Test

A stripping amount of the aggregates is measured by putting a Marshall specimen into a Los Angeles abrasion testing machine and rotating at 300 rpm without steel balls (This test method is mainly used in Europe as a method for evaluating the scattering resistance of the aggregates in the open-graded asphalt concrete). The residual Cantabro test is carried out by immersing the Marshall specimen in a water tank at a temperature of 60±1° C. for 48 hours. Moreover, the Cantabro test is carried out at 20° C.

As seen from Table 8, the porous asphalt concrete composition according to the invention (Example 3) is considerably excellent in the properties as compared with the conventionally known porous asphalt concrete compositions (Comparative Examples 3–5). Particularly, the Cantabor loss for evaluating the scattering resistance of the aggregates is less.

What is claimed is:

1. A paving asphalt concrete composition consisting essentially of 0.3–20% by weight of an oil-impregnated vulcanized rubber crumb and 99.7–80% by weight of an asphalt-aggregate mixture, the oil-impregnated vulcanized rubber crumb being previously prepared before mixing with the asphalt-aggregate mixture and consisting of 99–60% by weight of vulcanized rubber and 1–40% by weight of an extender oil, wherein the extender oil is an aromatic oil.

2. A paving asphalt concrete composition according to claim 1, wherein the asphalt is selected from the group consisting of straight asphalts 40/60, 60/80 and 80/100, semi-blown asphalt AC-100, and modified asphalts Type I and Type II.

3. A paving asphalt concrete composition according to claim 1, wherein the aggregate is crushed stones having a grading distribution and compounding ratio used in dense-graded, fine-graded, or open-graded asphalt concrete.

4. A paving asphalt concrete composition according to claim 1, wherein the asphalt-aggregate mixture is a mixture of 96–80% by weight of the aggregate with 4–20% by weight of asphalt.

5. A paving asphalt concrete composition according to claim 1, wherein the vulcanized rubber crumb has a grain size of 0.01–100 mm.

6. A paving asphalt concrete composition according to claim 5, wherein the vulcanized rubber crumb has a grain size of 0.05–10 mm.

7. A paving asphalt concrete composition according to claim 1, wherein the oil-impregnated vulcanized rubber crumb consists of 95–70% by weight of vulcanized rubber crumb and 5–30% by weight of an avonate oil.

8. A paving asphalt concrete composition according to claim 1, wherein said oil-impregnated vulcanized rubber crumb is present in an amount of 1–10% by weight.

9. A paving asphalt concrete composition according to claim 1, wherein said oil-impregnated vulcanized rubber crumb is present in an amount of 0.5–30% by weight.

10. A paving asphalt concrete composition according to claim 1, wherein the aggregate is sand having a grading distribution and compounding ratio used in dense-graded, fine-graded, or open-graded asphalt concrete.

11. A paving asphalt concrete composition according to claim 1, wherein the aggregate is stone powder having a grading distribution and compounding ratio used in dense-graded, fine-graded, or open-graded asphalt concrete.

12. A paving asphalt concrete composition consisting essentially of 0.3–20% by weight of an oil-impregnated vulcanized rubber crumb and 99.7–80% by weight of an asphalt-aggregate mixture, the oil-impregnated vulcanized rubber crumb being previously prepared before mixing with the asphalt-aggregate mixture and consisting of 99–60% by weight of vulcanized rubber and 1–40% by weight of an extender oil, wherein the extender oil is a paraffinic oil.

13. A paving asphalt concrete composition according to claim 12, wherein the asphalt is selected from the group consisting of straight asphalts 40/60, 60/80 and 80/100, semi-blown asphalt AC-100, and modified asphalts Type I and Type II.

14. A paving asphalt concrete composition according to claim 12, wherein the aggregate is crushed stones having a grading distribution and compounding ratio used in dense-graded, fine-graded, or open-graded asphalt concrete.

15. A paving asphalt concrete composition according to claim 12, wherein the aggregate is sand having a grading distribution and compounding ratio used in dense-graded, fine-graded, or open-graded asphalt concrete.

16. A paving asphalt concrete composition according to claim 12, wherein the aggregate is stone powder having a grading distribution and compounding ratio used in dense-graded, fine-graded, or open-graded asphalt concrete.

17. A paving asphalt concrete composition according to claim 12, wherein the asphalt-aggregate mixture is a mixture of 96–80% by weight of the aggregate with 4–20% by weight of asphalt.

18. A paving asphalt concrete composition according to claim 12, wherein the vulcanized rubber crumb has a grain size of 0.01–100 mm.

19. A paving asphalt concrete composition according to claim 18, wherein the vulcanized rubber crumb has a grain size of 0.05–10 mm.

20. A paving asphalt concrete composition according to claim 12, wherein the oil-impregnated vulcanized rubber crumb consists of 95–70% by weight of vulcanized rubber crumb and 5–30% by weight of a paraffinic oil.

21. A paving asphalt concrete composition according to claim 12, wherein said oil-impregnated vulcanized rubber crumb is present in an amount of 1–10% by weight.

22. A paving asphalt concrete composition according to claim 12, wherein said oil-impregnated vulcanized rubber crumb is present in an amount of 0.5–3.0% by weight.

23. A paving asphalt concrete composition consisting essentially of 0.3–20% by weight of an oil-impregnated vulcanized rubber crumb and 99.7–80% by weight of an asphalt-aggregate mixture, the oil-impregnated vulcanized rubber crumb being previously prepared before mixing with the asphalt-aggregate mixture and comprising 99–60% by weight of vulcanized rubber and 1–40% by weight of an extender oil, wherein the extender oil is a naphthenic oil.

24. A paving asphalt concrete composition according to claim 23, wherein the asphalt is selected from the group consisting of straight asphalts 40/60, 60/80 and 80/100, semi-blown asphalt AC-100, and modified asphalts Type I and Type II.

25. A paving asphalt concrete composition according to claim 23, wherein the aggregate is crushed stones having a grading distribution and compounding ratio used in dense-graded, fine-graded, or open-graded asphalt concrete.

26. A paving asphalt concrete composition according to claim 23, wherein the aggregate is sand having a grading distribution and compounding ratio used in dense-graded, fine-graded, or open-graded asphalt concrete.

27. A paving asphalt concrete composition according to claim 23, wherein the aggregate is stone powder having a grading distribution and compounding ratio used in dense-graded, fine-graded, or open-graded asphalt concrete.

28. A paving asphalt concrete composition according to claim 23, wherein the asphalt-aggregate mixture is a mixture of 96–80% by weight of the aggregate with 4–20% by weight of asphalt.

29. A paving asphalt concrete composition according to claim 23, wherein the vulcanized rubber crumb has a grain size of 0.01–100 mm.

30. A paving asphalt concrete composition according to claim 29, wherein the vulcanized rubber crumb has a grain size of 0.05–10 mm.

31. A paving asphalt concrete composition according to claim 23, wherein the oil-impregnated vulcanized rubber crumb consists of 95–70% by weight of vulcanized rubber crumb and 5–30% by weight of a naphthenic oil.

32. A paving asphalt concrete composition according to claim 23, wherein said oil-impregnated vulcanized rubber crumb is present in an amount of 1–10% by weight.

33. A paving asphalt concrete composition according to claim 23, wherein said oil-impregnated vulcanized rubber crumb is present in an amount of 0.5–3.0% by weight.

* * * * *